US006393055B1

(12) United States Patent
Martin

(10) Patent No.: US 6,393,055 B1
(45) Date of Patent: May 21, 2002

(54) METHOD OF SWITCHING VIDEO SEQUENCES AND CORRESPONDING SWITCHING DEVICE AND DECODING SYSTEM

(75) Inventor: François Martin, Chenneviere-Sur-Marne (FR)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/085,668

(22) Filed: May 27, 1998

(30) Foreign Application Priority Data

May 27, 1997 (EP) ............................................. 97401160
Dec. 23, 1997 (EP) ............................................. 97403137

(51) Int. Cl.$^7$ ................................................ H04B 1/66
(52) U.S. Cl. ....................... 375/240; 375/240; 370/487; 370/498; 370/527
(58) Field of Search .......................... 375/240; 348/584, 348/426, 432, 473, 469; 370/487, 498, 527

(56) References Cited

U.S. PATENT DOCUMENTS 5,534,944 A * 7/1996 Egawa et al. ................ 348/584
5,917,830 A * 6/1999 Chen et al. .................. 370/487

6,137,834 A * 10/2000 Wine et al. .................. 375/240

FOREIGN PATENT DOCUMENTS

EP 0692912 A2 1/1996
WO 9708898 A1 3/1997

OTHER PUBLICATIONS

ISO/IEC 13818–2; 1995, pp. V–IX.
ISO/IEC 13818–2; 1995, "Video Buffering Verifier", pp. 154–159.
ISO/IEC 13818–1; 1994, "Splicing Transport Streams", pp. 135–137.
"Switching Facilities in MPEG–2, Necessary but not Sufficient", by. S. Merrill Weiss, SMPTE Journal, Dec. 1995, pp. 788–802.
PHF 95,003, U.S. Serial No. 08/683,393, filed: Jul. 18, 1996.

* cited by examiner

Primary Examiner—Chris Kelley
Assistant Examiner—Shawn S. An
(74) Attorney, Agent, or Firm—Russell Gross

(57) ABSTRACT

The invention relates to a method of switching from a first to a second video sequence, in which it is provided, in order to avoid the creation of special access points such as splicing points defined in MPEG standard, to insert at the switching point, between the two sequences, an additional sequence of k pictures. These pictures, said minimal in that sense that they are coded with a reduced number of bits, may be for instance uniform colour pictures or the repetition of a single previous I or P picture.

6 Claims, 4 Drawing Sheets

METHOD OF SWITCHING VIDEO SEQUENCES AND CORRESPONDING SWITCHING DEVICE AND DECODING SYSTEM

BACKGROUND OF THE INVENTION

The present invention relates to a method of switching from a first video sequence to a second one, both old and new sequences being composed of pictures of type T=I, P or B according to the fact that said pictures are independently coded, or predicted from earlier I or P pictures, or bidirectionally predicted from earlier and later P pictures and/or I pictures. It also relates to a device for implementing said switching method and to a decoding system including such a device. This invention may be used for example for replacing a national television programme by a local one, and is particularly useful in relation with the MPEG-2 standard.

The principles of said standard, adopted by the Moving Pictures Experts Group (MPEG) of the International Standard Organization (ISO) and described in numerous documents, are recalled in detailed manner for instance in "Switching facilities in MPEG-2 necessary but not sufficient", SMPTE Journal, Vol.104, n° 12, Dec. 1995, pp. 788–802.

As explained in that document, switching means the splicing of programme segments or complete programmes (including video, audio and related data), i.e in fact the concatenation of different elementary streams. In the following, for sake of simplicity, the description will be limited to the case of only two different bitstreams, that may have been generated at different locations and/or at different times, and were not a priori intended to be spliced together when they were generated.

Concerning the structure itself of these bitstreams, it must be recalled that a compressed video sequence consists of groups of pictures (GOPs) comprising different types of coded pictures I, P and B. The I pictures Cintra coded) are independently coded (by intra-frame techniques only, with no need for previous information, i.e without reference to other pictures), while the P pictures (predictive-coded) are predicted from earlier I pictures or from earlier P ones, and the B pictures (bidirectionally predictive coded) are bidirectionally predicted from earlier and later P pictures and/or I pictures.

According to these different types of prediction, pictures are coded with more or less efficiency (I pictures are the least efficiently coded ones, P pictures are more efficient, and B pictures are the most efficient in their coding). Since the number of bits necessary to code the pictures is not constant, as the decoding is done at a regular period T(V), the bits of the coded pictures do not spend the same time in the decoder's buffer.

The MPEG standard specifies an abstract model of decoding called Video Buffer Verifier (VBV) and used to verify that an MPEG bitstream is decodable with reasonable buffering and delay requirement: by way of the buffer occupancy, constraints are imposed to the bitstream, so that decoding may occur without buffer underflow or overflow. The so-called vbv_delay then represents the time spent in said decoder's buffer by the first bit of a coded picture. Performing a switch with a picture regularly decoded at said period T(V) is not possible if the vbv_delays of the first "old" picture suppressed and the first "new" picture transmitted are different (one calls the old pictures the ones which will be replaced by the new ones from a given point: this point, called the splice, is the boundary between data belonging to the old bitstream and data belonging to the new one). Moreover, since the sizes of the pictures replaced and the pictures inserted are different, a decoder's buffer underflow or overflow may occur. A simple switch between two coded video sequences is therefore generally not possible.

In order to avoid any presentation discontinuity at the display side (no apparent interruption in the flow of the data keeps the viewers absorbed on a continuous basis), it is necessary to have no decoding discontinuity, which is possible only if the splice is seamless, i.e. if a smoothly flowing bitstream is obtained. This implies that the decoding time of the first access unit of the new stream is consistent with respect to the decoding time of the access unit of the old stream preceding the splice, which is generally not the case except at favourable locations that are called splicing points and are indicated in particular fields of the bitstreams. Such an access point is located between two coded pictures and defines a fixed standardized vbv_delay value of the first bit following such a point, also called splice decoding delay (the construction of a splicing point also guarantees that no overflow is generated at the transition between old and new sequences). A switching operation can then be performed only if the same splicing points are present on both new and old video sequences. However, currently these points are purely formal, only few splice decoding delay values are defined, and no coding systems are able to perform them. Moreover, in case of video sequence replacement (i.e. of two successive video switchings, with a first forward transition from the old sequence to the new one, and a second backward transition from the new sequence back to the old one), splicing points can be used only if the temporal position of the old and new splicing points corresponding to the backward switching are predictable and compatible. This implies regular and standard GOP structure for the two video sequences, but this requirement is generally not fulfilled.

SUMMARY OF THE INVENTION

A first object of the invention is therefore to propose a method that allows video sequence switching without the constraints of splicing point creation.

To this end the invention relates to a method such as described in the preamble of the description and moreover characterized in that an additional sequence of k pictures is inserted at the switching point between the two sequences, k having a value sufficient in order to have compatible sequences and said additional pictures being coded with a few number of bits.

According to said method, the new video sequence is delayed by k periods T(V) until vbv_delays are compatible. This delay creates for the decoder a lack of k pictures between the old and the new video sequence, and the additional sequence of k pictures takes this place. The decoder will now continuously and successfully display the pictures of the old sequence, the k minimal pictures, and the pictures of the new sequence.

Another object of the invention is to propose a device for implementing said switching method.

To this end the invention relates, in a decoding system for decoding n parallel video bitstreams corresponding to video sequences of pictures said intra if they have been coded without any reference to any other picture or said predicted or interpolated according to the fact that they are predicted by motion-compensated prediction from an earlier intra or predicted picture or bidirectionally interpolated from an earlier and a later picture, or in association with such a system, to a switching device comprising selecting means provided for a selective switchover of the bitstream which has to be decoded according to a switching method such as hereinabove described.

Another object of the invention is also to propose a decoding system including such a switching device.

To this end the invention relates to a decoding system for decoding n parallel video bitstreams corresponding to video sequences of pictures said intra if they have been coded without any reference to any other picture or said predicted or interpolated according to the fact that they are predicted by motion-compensated prediction from an earlier intra or predicted picture or bidirectionally interpolated from an earlier and a later picture, said system comprising a switching device that includes in cascade selecting means, for the selection of the bitstream which has to be decoded, and decoding means for decoding said selected bitstream, wherein said selecting means comprise, in view of the implementation of a method as hereinabove described, control means for a selective switchover of the bitstream which has to be decoded.

BRIEF DESCRIPTION OF THE DRAWINGS

The particulaities anadvatages of the invention will now become more apparent from the following description and the accompanying drawings, in which.

DETAILED DESCRIPTION OF THE PREFERRED EMBODIMENTS

Figure 1:
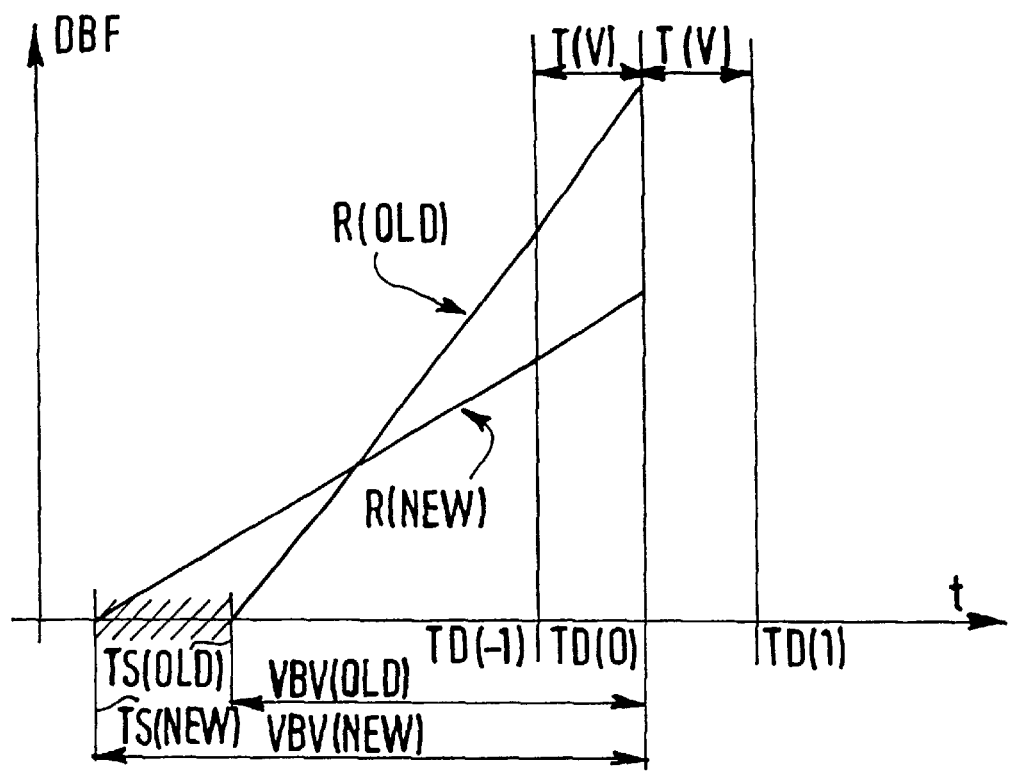
FIGS. 1 and 2 are graphs of decoder's buffer fullness versus time respectively without the invention and when the invention is implemented.

In order to better understand the principles of the invention, some problems occurring when switching must be recalled. A first switching problem is illustrated in FIG. 1, which is a graph of decoder's buffer fullness DBF versus time. The first line R(OLD) corresponds to the bitstream associated to the first replaced picture of the old sequence and designates the video bitrate of the old sequence, that has to be replaced by the new one. This last picture, without switching (i.e. if not replaced), is decoded at time TD(0). If switching occurs, the first transmitted picture of the new sequence (the line R(NEW) corresponds to the bitstream associated to this first transmitted picture, R(NEW) designating the video bitrate of this new sequence) would be decoded at the same time TD(0). As the local video bitrate R(NEW) is lower than the national one R(OLD), and considering therefore the VBV_delays VBV(OLD) and VBV(NEW) associated to each picture respectively and the corresponding times TS(OLD) and TS(NEW) (with: TS(OLD)=the time when the first bit of the first replaced picture of the old sequence enters the decoder's buffer =TD(OLD)-VBV(OLD); TS(NEW)=the time when the first bit of the first transmitted picture of the new sequence enters (theoritically) the decoder's buffer=TD(NEW)-VBV (NEW); TD(OLD) and TD(NEW)=times when said first replaced picture and first transmitted picture are decoded), it appears in fact that TS(NEW) occurs before TS(OLD) and that it is therefore impossible to send at the same time the bits of the last transmitted picture of the old sequence and the bits of the first transmitted picture of the new one.

According to the invention (see FIG. 2, explained later in a more detailed manner), it has therefore been decided to insert at the forward transition (when switching from the old sequence to the new one) an additional sequence of k pictures, delaying the new sequence by k periods T(V). The number k is sufficient to allow TS(NEW) to occur after TS(OLD), and said k pictures have particular characteristics that allow them to be easily coded (they are represented by a few number of bits and are therefore called minimal pictures in the description).

The aim of the minimal pictures is, while the new sequence is delayed, to empty the decoder's buffer as soon as possible. A way to constitute such an additional sequence is for instance to consider a sequence of k uniform colour pictures (called UC pictures in the following) where all the pixels are identical (for instance an I picture and (k−1).P pictures). Another solution is to consider a sequence of k P pictures, obtained for example by considering the pictures of said minimal sequence as copies of a previous I or P picture, which is equivalent, for the decoder, to freeze the last I or P picture of the old sequence during (k.T(V)) seconds.

In the case of k UC pictures, since all pictures are the same, the P pictures can be described, in the compression syntax, as copies of the first I picture with a minimum number of bits. Thus the additional processing step required to code said UC sequence is restricted to the encoding of the first I picture of this sequence.

In the case of k P pictures, these pictures are described by the MPEG-2 syntax as the copy of the previous one. In fact the effect of such a technical solution on the transition is the freeze of the last picture of the old sequence during k.T(V) seconds instead of having UC pictures during the same period.

In both cases, due to VBV_delay considerations, a minimum number of minimal pictures has to be inserted at the considered transition (as can be seen in FIG. 1). In view of the determination of said number in case of UC pictures, the following notations (in bits) are chosen:

D(I)=size of the I pictures of the UC picture sequence;
D(P)=size of the P pictures of the UC picture sequence;
S(MAX)=size of the decoder's buffer.

The minimum number k depends on the characteristics of the first replaced picture of the old sequence and those of the first inserted picture of the new one. Knowing that the pictures are decoded at the constant period T(V), the number k has to be such that, between TS(OLD) and TS(NEW), all the bits of the k UC pictures are transmitted. This is possible if:

$$TS(NEW)-TS(OLD)>(D(I)+(k-1)\cdot D(P))/R(OLD) \qquad (1),$$

that is to say if TS(NEW)−TS(OLD) is greater than the duration of the period that is needed for the transmission of the minimal pictures at the bitrate R(OLD). This condition leads for k to a minimal value given by the relation (2):

$$k > \left(VBV(NEW) - VBV(OLD) + \frac{D(I)-D(P)}{R(OLD)}\right) \qquad (2)$$

$$\left(\frac{R(OLD)}{(R(OLD)\cdot T(V))-D(P)}\right)$$

Since VBV(NEW) is over-bounded by S(MAX)/R(NEW), k can be approximately over-bounded by k(MAX) such as:

$$k(MAX) > \left(\frac{S(MAX)}{R(NEW) \cdot T(V)}\right) + 1 \quad (3)$$

In view of the determination of the minimum number in case of k P pictures, the relation (2) is now replaced by the following relation (4):

$$k > (VBV(NEW) - VBV(OLD)) \cdot \left(\frac{R(OLD)}{(R(OLD) \cdot T(V)) - D(P)}\right) \quad (4)$$

Figure 2:
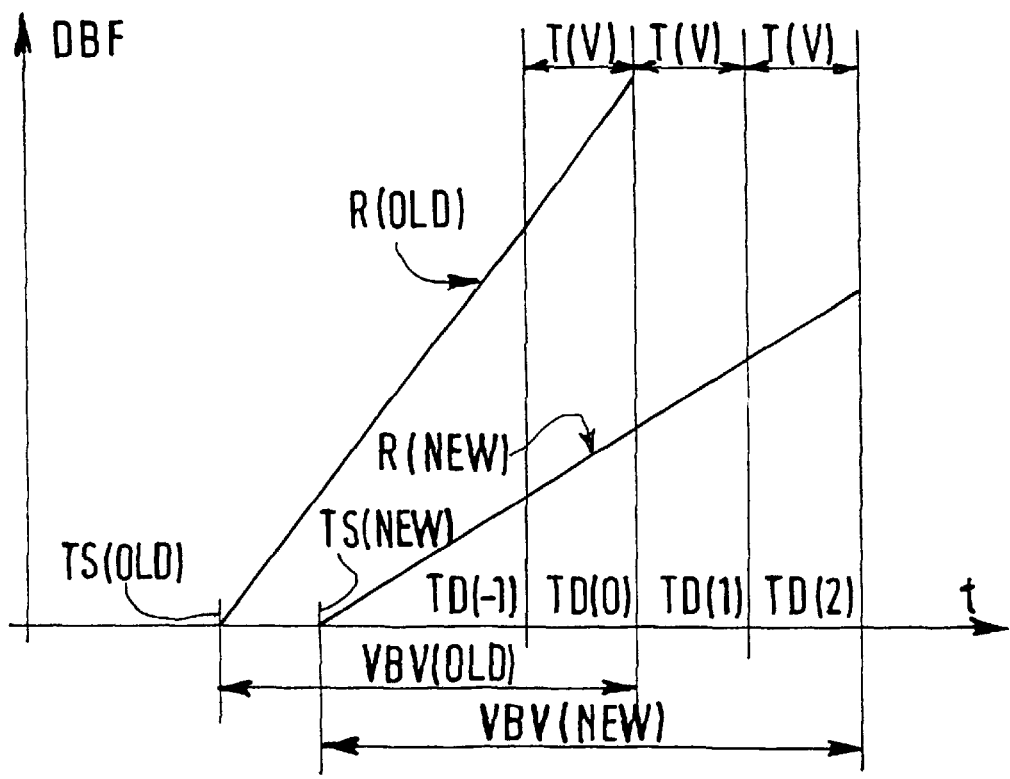

The proposed solution is illustrated in FIG. 2, which is the modified graph of decoder's buffer fullness DBF versus time when said solution is implemented : TS(NEW) now occurs after TS(OLD), the last transmitted picture of the old sequence may be, considering the value of VBV(OLD), decoded at TD(−1), the first transmitted picture of the new sequence may be, considering the value of VBV(NEW), decoded at TD(2), and, between these first replaced and first transmitted pictures, minimal pictures are sent between TS(OLD) and TS(NEW) and decoded at TD(0) and TD(1).

Moreover, since the transmitted rates R(OLD) and R(NEW) are generally different, when a switching transition occurs, the input rate entering the decoder's buffer is different from the one that would have entered without any switching, and there is a risk of overflow in the buffer when the input rate becomes greater. A verification of non overflow must consequently be carried out. Decoder's buffer fullness must be computed from time TS(NEW) to time TD(OLD). If an overflow is possible, minimal pictures must be inserted until the condition of non overflow is verified or until TS(NEW) is higher than TD(OLD). The number k of minimal pictures verifying this last condition is such as: TD(OLD)−TS(NEW)<0, which leads to: k>(VBV(NEW)/T(V))+1. Since VBV(NEW) is over-bounded by S(MAX)/R(NEW), k can be over-bound by $k(MAX)$ such as: \quad (5)

$$k(MAX) > \left(\frac{S(MAX)}{R(NEW) \cdot T(V)}\right) + 1$$

which is identical to the previous result (relation (3)).

Figure 3:
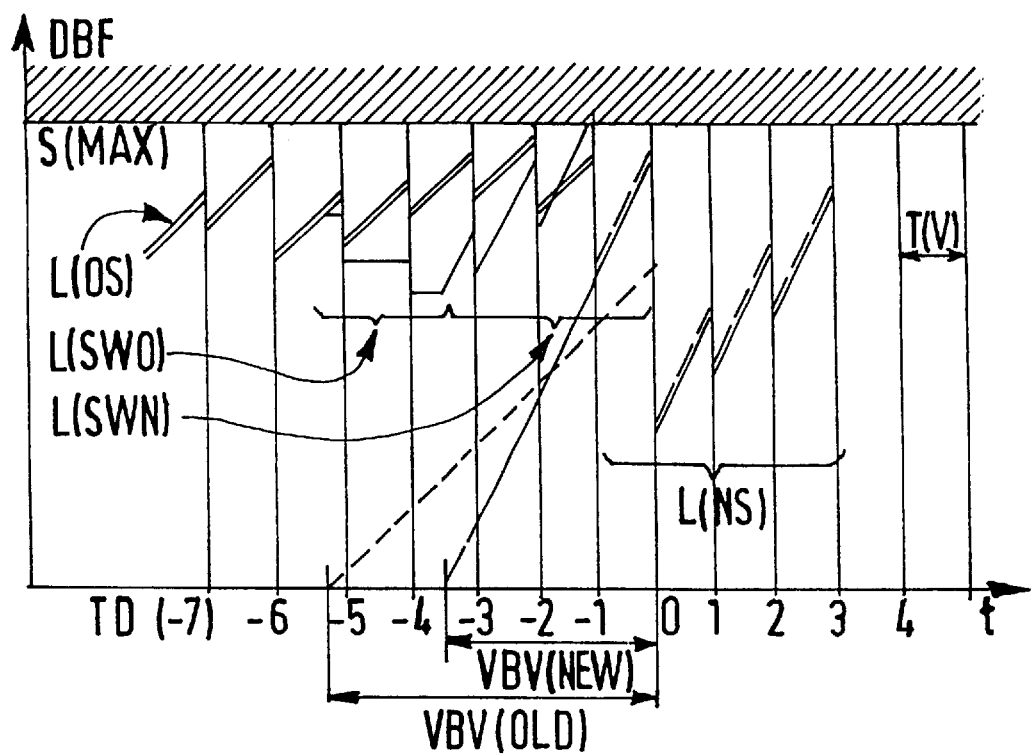
FIG. 3 illustrates a possible problem of buffer overflow.

This problem of possible buffer overflow when R(NEW) is greater than R(OLD) can be seen in FIG. 3, illustrating the evolution of the decoder's buffer fullness S(t) (S(MAX) designates the maximum value of S(t)). The line L(OS) corresponds to the state, at each time t, of the buffer fullness for the old sequence alone: at times TD(−7), TD(−6), ..., TD(−2), TD(−1), pictures of said old sequence are decoded, while, in the meantime, the buffer fullness increases according to the bitrate R(OLD) (the value of VBR(OLD) indicates at what time the first bit to be decoded has been stored, after transmission, in the decoder's buffer). The line L(NS) similarly corresponds to the state of the buffer fullness for the new sequence alone: at times TD(0), TD(1), TD(2), and so on, pictures of said new sequence are decoded, while, in the meantime, the buffer fullness increases according to the bitrate R(NEW) (similarly, the value of VBV(NEW) indicates at what time the first bit to be decoded has been stored in the decoder's buffer). The line L(SW0) corresponds to the real state of the buffer when switching is performed and before the decoded data corresponding to the new sequence enter the buffer: the decrease of the fullness at decoding times is the same as previously for the old sequence, but no further decoded data enter the buffer. The line L(SWN) corresponds to the real state of the buffer if the decoded data corresponding to the new sequence enter said buffer: there is an overflow, at time TD(−1) in this example.

Figure 4:
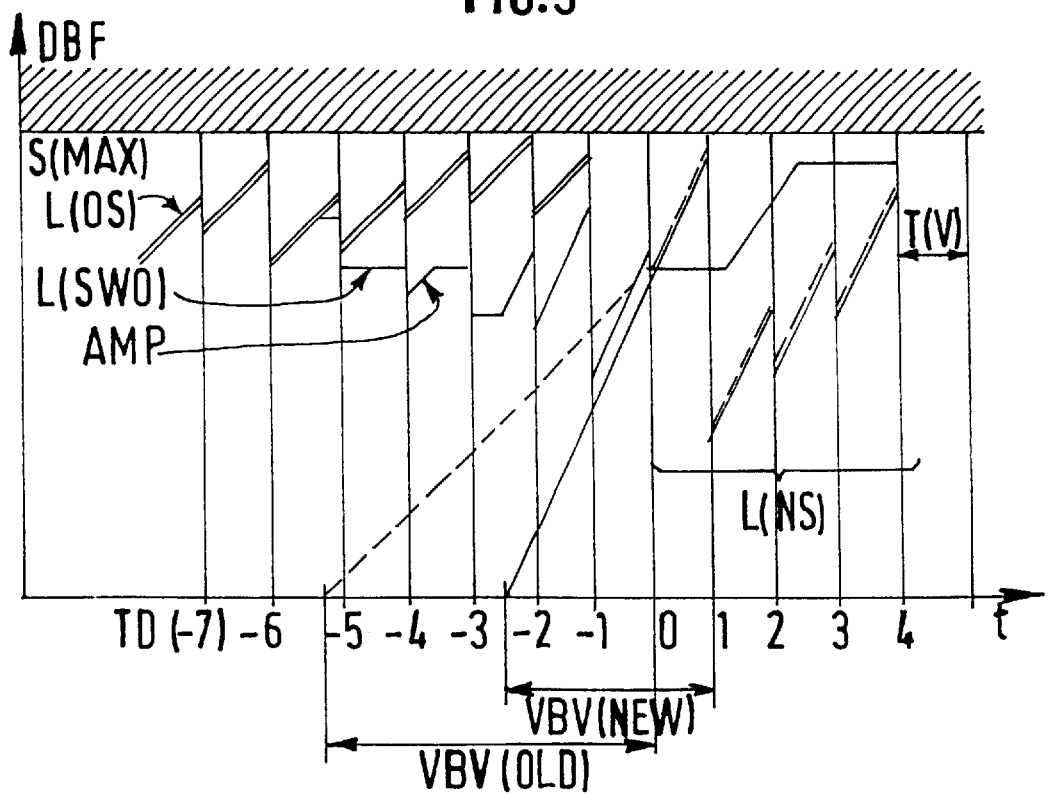
FIG. 4 the solution proposed according to the invention.

The proposed method solves this problem, as can be seen in FIG. 4. As previously in FIG. 3, the line L(OS) corresponds to the state of the buffer fullness for the old sequence, without any modification. The line L(SW0) originally corresponds to the state of the buffer when switching is performed, the modification according to the invention beginning at the switching time, when an additional minimal picture AMP is inserted at rate R(OLD) after the old sequence. This minimal picture allows to delay by one period T(V) the storing step of the new sequence (the whole line L(NS) is only delayed by one period T(V), for one additional minimal picture) and also the (instantaneous) decoding time of this new sequence, which is in the present case sufficient to prevent buffer overflow. This delay is indeed sufficient to allow the decoder's buffer fullness to decrease enough to avoid the overflow occurring in FIG. 3. Obviously, more minimal pictures may be introduced, only their minimal number k being evaluated as indicated above.

Figure 5:
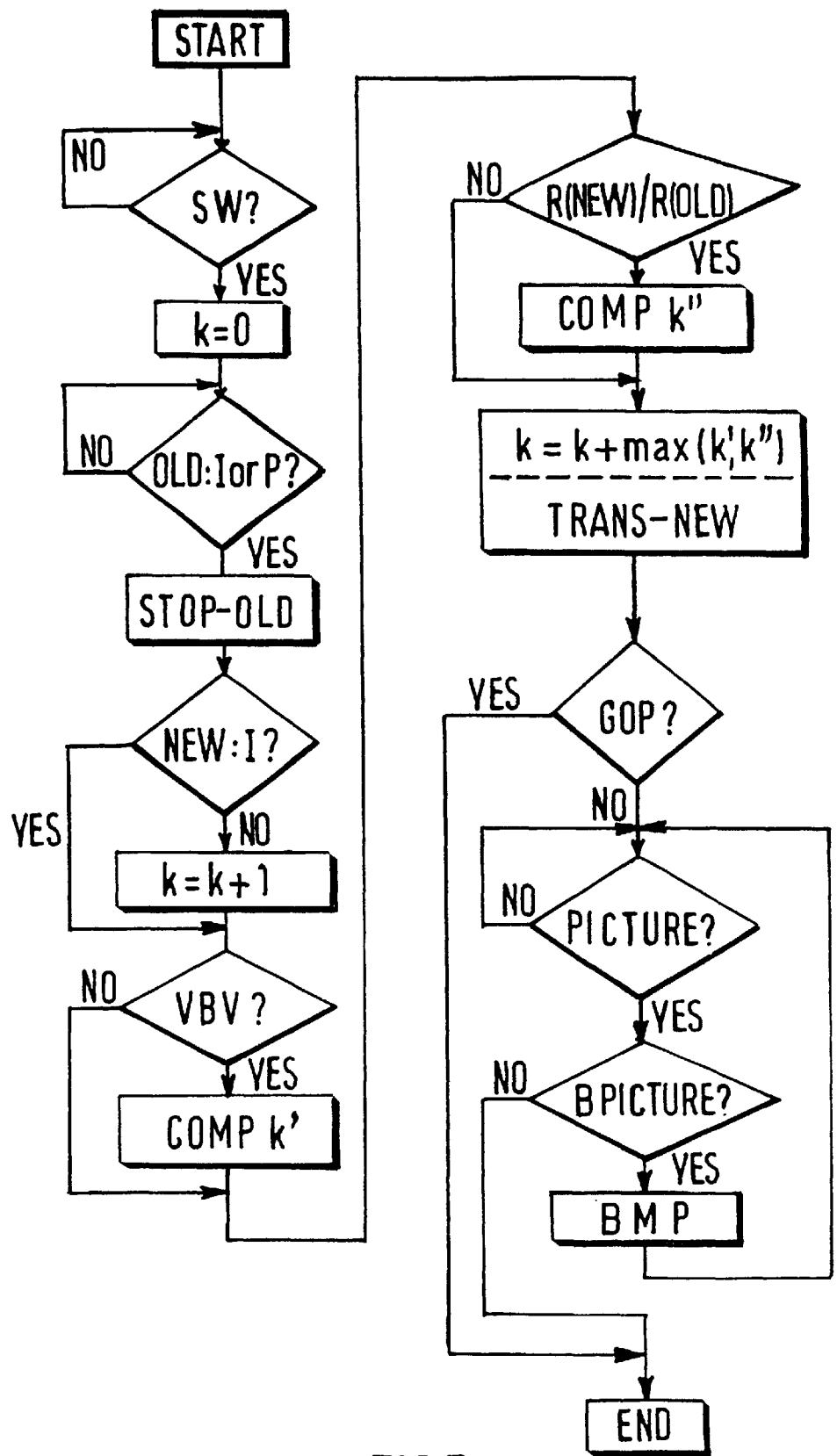
FIG. 5 is a flowchart illustrating the successive steps of the switching method according to the invention.

The whole switching method in accordance with the invention may therefore be implemented as illustrated in FIG. 5 and according to the following steps, initialized at the position "START":

(1) is a switch requested? to this question, illustrated by: SW?, the reply is:
   (a) no: the procedure is re-initialized;
   (b) yes: the value of k is initialized to 0 (k=0), and the second step can be carried out;

(2) is an I or P picture detected in the old sequence? to this question, illustrated by OLD: I or P?, the reply is:
   (c) no: a loop allows to wait until an I or P picture is really present and detected;
   (d) yes: the transmission of the old sequence is stopped (illustrated by STOP-OLD), i.e. no further bits enter the decoder's buffer while the decoding step continues, and the third step can be carried out;

(3) is an I picture ready in the new sequence? to this question, illustrated by: NEW: I?, the reply is:
   (e) no: k is increased by one (k=k+1), a minimal picture is transmitted at rate R(OLD) and the fourth step can be carried out;
   (f) yes: the fourth step can be directly carried out;

(4) is VBV(NEW) greater than VBV(OLD)+k.T(V)? to this question, illustrated by VBV?, the reply is
   (g) yes: the number k' of minimal pictures to be inserted is computed (illustrated by: COMP k'), and the fifth step can be carried out;
   (h) no: the fifth step can be directly carried out;

(5) is R(NEW) greater than R(OLD)? to this question illustrated by: R(NEW)/R(OLD), the reply is:
   (i) yes : the number k" such as possible overflow is avoided is computed (illustrated by: COMP k"), and the sixth and seventh steps can be carried out;
   (j) no: the sixth and seventh steps can be directly carried out;

(6) the value of k is increased according to the formula: k=k+max(k', k"), and k minimal pictures are transmitted at rate R(OLD);

(7) the transmission of the new sequence begins (illustrated by TRANS-NEW), at a time t such as t=TD(NEW)−VBV(NEW), i.e. t=TD(OLD)+k.T(V)−VBV(NEW).

It is then clear that, at the first switching point, before TS(OLD), the decoder's buffer does not underflow nor overflow since the old video sequence is a compliant compressed video sequence (i.e. the decoder's buffer fullness is strictly ensured by the encoding process). Between TS(OLD) and TD(OLD), the decoder's buffer does not underflow, since there are always bits of pictures to decode in the buffer (either pictures of the old video sequence or UC pictures), nor overflow since bits of UC pictures enter with a rate lower than or equal to R(OLD), which is the bitrate of a compliant compressed video sequence. Between TD(OLD) and TD(NEW), the decoder's buffer does not underflow, since there are always bits of pictures to decode in the buffer (either UC pictures or pictures of the new video sequence) nor overflow, since UC pictures are so short (when considering the number of bits) that the buffer fullness is lower than the fullness at TD(NEW), which is itself a fullness associated to a compliant compressed video sequence. After TD(NEW), the decoder's buffer obviously does not underflow or overflow since the new video sequence is a compliant compressed video sequence.

The present invention is obviously not limited to the case of a single video switching. For instance, the case of a video sequence replacement (as presented in the beginning of the description) is equivalent to perform switching two times: a first time, when the old sequence is replaced by minimal pictures and said minimal pictures are replaced by the second sequence, and a second time, when the second sequence is replaced by minimal pictures and said minimal pictures are replaced by the original old sequence. In such a situation, the minimum number of minimal pictures to be inserted the second time must be chosen so that the first old picture to be again transmitted is an I picture, which implies that this second number of minimal pictures is not fixed but dependent of the GOP structure. It is known, also, that a GOP may be organized in the following manner:

B0, B1, I2, B3, B4, P5, B6, B7, P8, . . . , . . . in the display order;

I2, B0, B1, P5, B3, B4, P8, B6, B7, . . . , . . . in the transmission order.

Due to B pictures definition, it is clear that pictures B0 and B1 are coded by using prediction from I2 and from the last P picture of the previous GOP, which defines a so-called non closed GOP. To solve the problem raised by the fact that first B pictures, at transitions, will be decoded by using prediction from a P picture of a completely different sequence, first B pictures of such non closed GOPs will be replaced by minimal pictures at transitions. In this case, these minimal pictures are bidirectional predictive-coded pictures in which only the first and last macroblocks of each slice are encoded with only forward prediction, null forward vectors and no error prediction (the other macroblocks are said skipped macroblocks). Thus a decoder will consider such minimal pictures as copies of the last presented I or P picture.

This solution is also illustrated in FIG. 5, in which corresponding additional steps are provided:

(8) is the first GOP of the new sequence a closed GOP? to this question, illustrated by: GOP?, the reply is
  (k) yes: the implementation of the method according to the invention is completed ("END");
  (l) no: the ninth step can be carried out;

(9) is a picture detected in new sequence after the first I picture? to this question, illustrated by: PICTURE?, the reply is:
  (m) no: a loop allows to wait until a picture is really present and detected;
  (n) yes: the tenth step can be carried out;

(10) is said detected picture a B picture? to this question, illustrated by: B PICTURE?, the reply is:
  (o) yes: said B picture is replaced by a B minimal picture BMP;
  (p) no: the implementation of the method is completed ("END").

Figure 6:
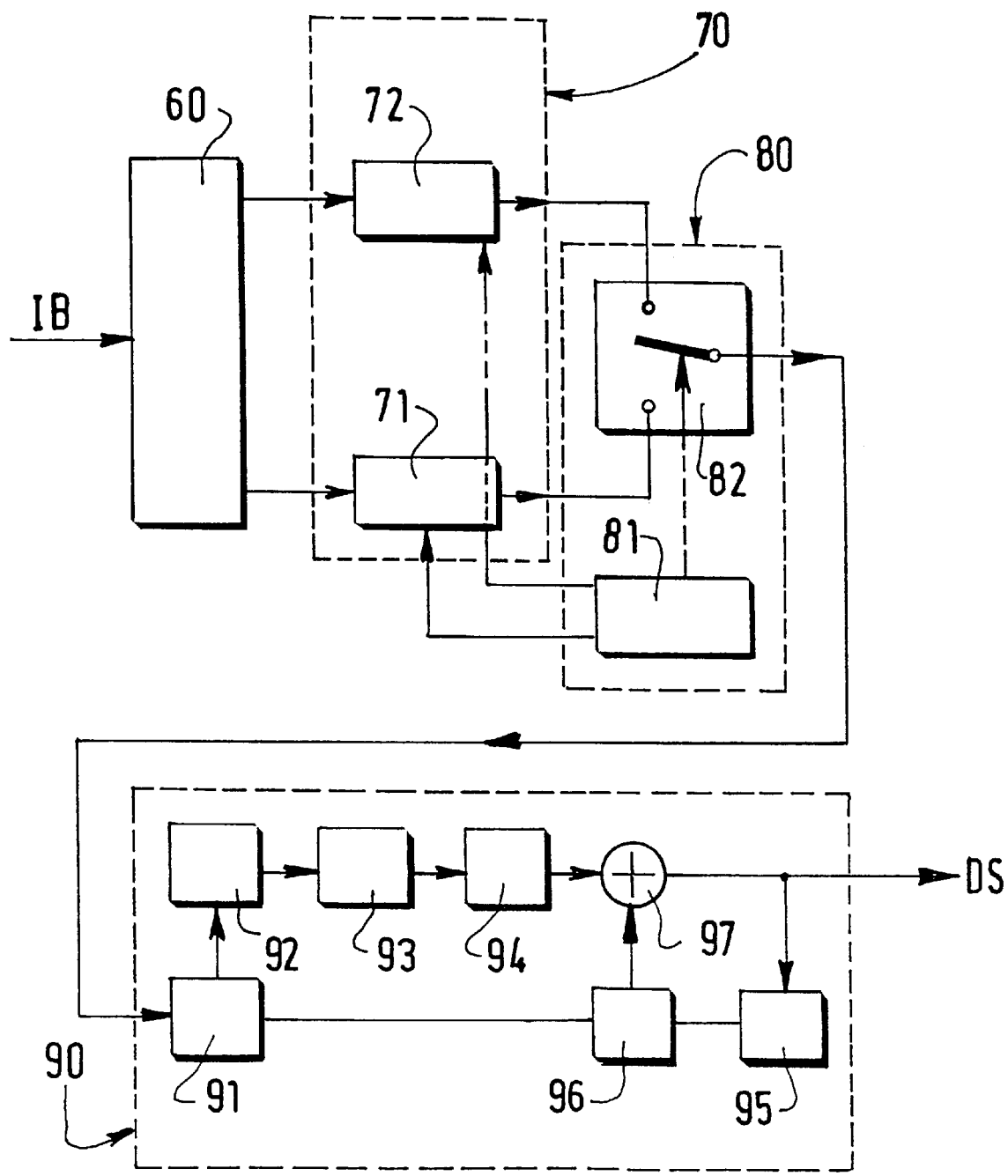
FIG. 6 shows an embodiment of a decoding system including a switching device according to the invention.

Obviously, the invention is not limited to the above-described method, and it also relates to a device for implementing said switching method and to a decoding system including such a device. A system for decoding at least two and preferably n parallel video bitstreams corresponding to video sequences of pictures of type T=I, P or B is described for instance in the Euro-PCT patent application 0783817 (PHF95003). Such a system, shown in FIG. 6, comprises a demultiplexer 60 which receives an input bitstream IB including a plurality (generally n, only two in the represented embodiment) of individual video bitstreams and the outputs of which (two in the case of FIG. 6) are sent to storing means 70 comprising in this embodiment the same number (two) of buffers (71 and 72).

The switching action occurs in a control unit 81 provided for selecting the buffer corresponding to the selected bitstream which will be decoded, for instance the buffer 72, and, at the same time, for controlling the transfer of the other bitstream (which at that moment has not to be decoded, since it has not been selected, for instance by an user action) towards the other buffer 71. At the outputs of parallel buffers 71 and 72, a switch 82 controlled by the control unit 81 with which it constitutes control means 80 selects the appropriate buffer output signal and sends it towards a decoder 90. This decoder comprises for example a demultiplexer 91 (provided for separating the signals to be decoded and associated motion vectors), a variable length decoder 92, a dequantizer 93, an inverse orthogonal transform circuit 94, and a prediction circuit comprising a memory 95, a motion compensation circuit 96 (receiving said motion vectors), and an adder 97 which yields the output decoded signals DS to be displayed (such a decoder is conventional and will not be described in a more detailed manner). The present invention relates both to a switching device such as the one constituted by said control means and to a decoding system comprising such a switching device.

What is claimed is:

1. A method of switching from a first video sequence to a second one, both old and new sequences being composed of pictures of type T=I, P or B according to the fact that said pictures are independently coded, or predicted from earlier I or P pictures, or bidirectionally predicted from earlier and later P pictures and/or I pictures, wherein an additional sequence of k pictures is inserted at the switching point between the two sequences, k having a value sufficient in order to have compatible sequences and said additional pictures being coded with a few number of bits;

wherein the following steps are implemented:
  (a) the old sequence to be replaced by the new one is cut on a P picture, at a first switching point, and a sequence of k minimal P pictures is then inserted;
  (b) after this sequence of additional pictures, at a second switching point said new sequence is inserted;

wherein said sequence is a sequence of k uniform colour pictures.

2. A method of switching from a first video sequence to a second one, both old and new sequences being composed of pictures of type T=I, P or B according to the fact that said pictures are independently coded, or predicted from earlier I or P pictures, or bidirectionally predicted from earlier and later P pictures and/or I pictures, wherein an additional sequence of k pictures is inserted at the switching point between the two sequences, k having a value sufficient in order to have compatible sequences and said additional pictures being coded with a few number of bits, wherein each time a B picture is predicted from a P picture not included in the same group of pictures, the first B pictures of any group of images are replaced by minimal B pictures at transitions.

3. A method according to claim 2, wherein the following steps are implemented:
   (a) the old sequence to be replaced by the new one is cut on a P picture, at a first switching point, and a sequence of k minimal P pictures is then inserted;
   (b) after this sequence of additional pictures, at a second switching point said new sequence is inserted.

4. A method according to claim 3, wherein said sequence is a sequence of pictures that are copies of a previous I or P picture.

5. A method according to claim 3, wherein the following additional steps are implemented after the steps (a) and (b):
   (c) said second sequence is cut at a third switching point, in order to be replaced by the first one;
   (d) at said third switching point, additional pictures are similarly inserted until the first old picture to occur is an I picture, the first old sequence being then re-inserted.

6. A method according to claim 2, wherein said old and new video sequences are bitstreams encoded according to the MPEG-2 standard.

* * * * *